United States Patent

Stephenson et al.

Patent Number: 6,013,183
Date of Patent: Jan. 11, 2000

[54] METHOD OF LIQUEFYING MICROORGANISMS DERIVED FROM BIOLOGICAL WASTEWATER TREATMENT PROCESSES

[75] Inventors: Robert J. Stephenson, Vancouver; Harpreet S. Dhaliwal, Surrey, both of Canada

[73] Assignee: Paradigm Environmental Technologies Inc., Vancouver, Canada

[21] Appl. No.: 09/129,422

[22] Filed: Aug. 5, 1998

[51] Int. Cl.[7] .......................................... C02F 3/00
[52] U.S. Cl. .................. 210/606; 210/610; 210/631; 241/2
[58] Field of Search .................... 210/601, 606, 210/610, 621, 622, 623, 630, 631, 603; 422/39; 435/259; 241/2

[56] References Cited

U.S. PATENT DOCUMENTS

| | | |
|---|---|---|
| 1,355,476 | 10/1920 | Hering . |
| 1,711,097 | 4/1929 | Kratzer . |
| 2,069,820 | 2/1937 | Dodge . |
| 3,658,262 | 4/1972 | Burant, Jr. .......................... 241/46 B |
| 3,718,582 | 2/1973 | Smith et al. . |
| 3,938,066 | 2/1976 | Bauer . |
| 4,042,494 | 8/1977 | Stoyer ................................. 210/7 |
| 4,123,426 | 10/1978 | Katayama et al. . |
| 4,190,528 | 2/1980 | Dassen ............................... 210/8 |
| 4,192,741 | 3/1980 | Deeks ............................... 210/6 |
| 4,261,836 | 4/1981 | Koglin ............................... 210/737 |
| 4,629,785 | 12/1986 | McCaffery, III . |
| 4,762,527 | 8/1988 | Beshore et al. . |
| 4,784,770 | 11/1988 | Nagao . |
| 4,985,149 | 1/1991 | Ohshima et al. . |
| 5,188,741 | 2/1993 | Zang et al. ......................... 210/774 |
| 5,282,980 | 2/1994 | Kew et al. . |
| 5,316,745 | 5/1994 | Ting et al. . |
| 5,509,609 | 4/1996 | Kamler ............................... 239/461 |
| 5,593,591 | 1/1997 | Ohsol et al. ......................... 210/609 |
| 5,846,425 | 12/1998 | Whiteman . |

OTHER PUBLICATIONS

APV Product Brochure, "Processing of Emulsions and Dispersions by Homogenization", 1996.
"Numerical and Experimental Study of a Homogenizer Impinging Jet", AICHE Journal, Apr. 1997, pp. 1100–1107.
"Thermal Test", WQI, Jul./Aug. 1996.

*Primary Examiner*—David A. Simmons
*Assistant Examiner*—Fred Prince
*Attorney, Agent, or Firm*—Oyen Wiggs Green & Mutala

[57] ABSTRACT

A process for liquefying microorganisms present in biosolids, such as waste activated sludge, generated by municipal or industrial wastewater treatment plants is disclosed. The process includes the step of passing a slurry of the sludge at a high pressure through a nozzle having a restricted flow area to cause liquefication of the microorganisms as they are discharged from the nozzle. The pressure drop across the nozzle preferably exceeds 5,000 psi. At least part of the liquefied microorganisms may be recirculated to the treatment facility to feed nutrients to the wastewater treatment process. Optionally, the liquefied microorganisms may be anaerobically converted to methane and carbon dioxide. For optimum results, the sludge is subjected to pH adjustment and/or maceration prior to being pumped through the high pressure nozzle.

13 Claims, 1 Drawing Sheet

METHOD OF LIQUEFYING MICROORGANISMS DERIVED FROM BIOLOGICAL WASTEWATER TREATMENT PROCESSES

TECHNICAL FIELD

This application relates to a process for liquefying biosolids, such as waste activated sludge, generated by municipal or industrial wastewater treatment plants.

BACKGROUND

In most municipal and industrial treatment facilities wastewater and sewage is purified in aerobic treatment processes. Bacteria and other microorganisms which occur naturally within sewage are cultured to consume organic wastes in aeration tanks. In these tanks the microbes multiply and digest the organic matter present in the wastewater. This process yields treated water, carbon dioxide, and a biomass of microbes which settles as a sludge in a clarifier connected to the aeration tanks. Some of the biomass is recycled to the tanks to reseed the system. The excess biomass, which is referred to as "waste activated sludge", is typically destroyed or otherwise disposed of. Costs associated with dewatering and disposing waste activated sludge can be substantial. Similar sludge management problems arise with other types of aerobic biological wastewater treatment systems, such as sequencing batch reactors and rotating biological contactors.

Various systems for conditioning sludge are known in the prior art. Some systems operate at elevated pressures or temperatures in order to increase bacterial digestion rates. For example, U.S. Pat. No. 4,192,741 issued Mar. 11, 1980 relates to a process for treating sewage effluent which includes the step of passing the activated sludge through a high pressure venturi to promote microbial activity.

It is also known in the prior art to condition activated sludge by pH adjustment. U.S. Pat. No. 3,718,582 issued Nov. 14, 1972 describes a microbial biolysis process in which the activated sludge is made alkaline by the addition of caustic soda and then hydrolyzed at an elevated temperature.

Maceration of sludge is commonplace as well. U.S. Pat. No. 3,658,262 which issued on Apr. 25, 1972 describes a grinder to reduce the size of sludge particles prior to thermal conditioning.

While such prior art systems are useful in reducing the volume of waste activated sludge, they typically result in increased energy, heating and/or materials costs. Accordingly, they do not meet the need to destroy or dispose of the waste activated sludge in an economical fashion.

The inventors have devised a cost-effective means of liquefying waste activated sludge or the like by lyzing microorganisms present in the sludge using a very high pressure homogenizer nozzle. Homogenizers are in common use in many industrial applications. Chemical, pharmaceutical, dairy, specialty food and biotechnological facilities all use homogenizers to emulsify, disperse, mix and process their products.

Homogenizers have recently been designed for high pressure operation. Such homogenizers employ high pressure pumps which force fluid through a valve or nozzle having a restricted flow area. As the fluid moves through the restriction, the velocity increases and the pressure decreases according to Bernoulli's law. Intense hydrodynamic changes occur in the fluid as high-pressure potential energy is converted to low-pressure kinetic energy.

In the biotechnology field, homogenizers have been used for cell disruption for many years. Passing a water slurry of microorganisms through a homogenizer disrupts the cell walls, allowing the contents to be released. In this way, the proteins and enzymes produced by the microorganisms can be harvested. However, heretofore homogenization technology has not been applied on an industrial scale to the problem of waste activated sludge management.

The need has therefore arisen for an industrial scale process for liquefying microorganisms present in sludge or other biosolids employing high-pressure homogenization technology.

SUMMARY OF INVENTION

In accordance with the invention, a method of liquefying microorganisms present in biosolids produced by a biological wastewater treatment facility, such as waste activated sludge, is disclosed. The method includes the step of passing a slurry of the microorganisms at a high pressure through a nozzle having a restricted flow area to cause liquefication of the microorganisms as they are discharged from the nozzle. The pressure drop across the nozzle preferably exceeds 5,000 psi. At least part of the liquefied microorganisms may be recirculated to the treatment facility to feed nutrients back to the biological wastewater treatment process. Optionally, the liquefied microorganisms may be anaerobically converted to methane and carbon dioxide.

The slurry may be subjected to pre-treatment to weaken the cell walls of microorganisms present in the slurry prior to being pumped through the high pressure nozzle. For example, the pH of the slurry may be altered, such as by treatment with sodium hydroxide, acid or other chemicals. Additionally, the slurry may be macerated in a chopper to reduce the particle size of the solid fraction.

BRIEF DESCRIPTION OF DRAWINGS

In a drawing which illustrate the preferred embodiment of the invention, but which should not be construed as restricting the spirit or scope of the invention in any way.

DESCRIPTION

Figure 1:
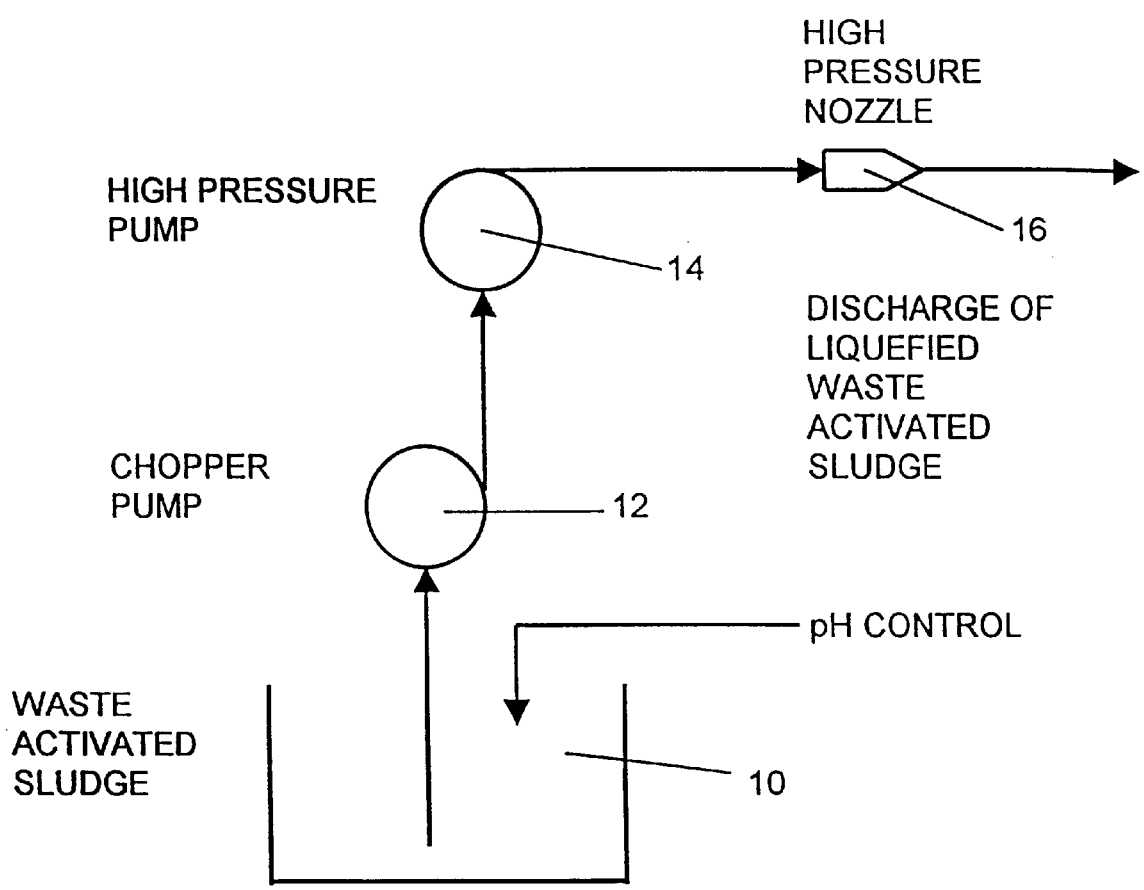
FIG. 1 is a schematic view of the applicant's waste activated sludge treatment process.

An activated sludge wastewater treatment system is a type of secondary biological treatment process used to clean wastewater before it is discharged into a receiving stream. The equipment used to carry out this process typically includes an aeration tank or basin where the raw wastewater is treated with microorganisms in the presence of dissolved oxygen. The treatment microorganisms reduce contaminants present in the wastewater and reduce the biological oxygen demand.

The second component of the system is typically a clarifier where solid sludge containing the microorganisms settles. Microorganisms in sludge vary widely. Aerobic and facultative anaerobic organisms predominate. Protozoa and bacteria make up most of the biomass, though small nematodes, insect larvae, yeasts, fungi and even algae are found in the sludge. Several bacterial species associated with activated sludge include Acinetobacter, Alcaligenes, Brevibacterium, Flavobacterium, Pseudomonas and Zooglea.

Settled sludge is removed from the clarifier on a regular basis. Some of the sludge is pumped back to the aeration tank to seed the growing system. This is sometimes referred to as return activated sludge or RAS. The excess sludge is removed from the system for further processing or disposal. This is called waste activated sludge or WAS. For example, the waste activated sludge may be dewatered and disposed of by incineration or it may be stored in a landfill. The clarified effluent, which now has a low solids content, is discharged into an outlet stream or storage container.

This application relates to a process for treating waste activated sludge (and/or return activated sludge). With reference to FIG. 1, the waste activated sludge is first conditioned by an acid or base in a tank reactor 10 to alter its pH. For example, the sludge may be treated with sodium hydroxide or some other alkaline reagent to help solubilize lipids present in the sludge, thereby making the microbial cells more prone to lysis. Depending upon the make-up of the sludge, the pH may be increased to about 11 for this purpose.

The sludge is then preferably delivered to a chopper pump 12 for maceration of solids present in the sludge. Reduction of the particle size of the solids helps prevent clogging of the high pressure nozzle 16 used in a subsequent step of the process as described below.

After pH adjustment and/or maceration pre-treatment, a slurry of the sludge is next delivered to a high pressure pump 14 which forces the slurry through a homogenizer nozzle 16 at very high pressures. Pressures within the range of about 10,000–20,000 psi have been found to be optimum. The slurry is subjected to a substantial pressure drop as it emerges through nozzle 16 from the high pressure environment to atmospheric pressure, which causes lysis and liquefication of the cellular material present in the sludge.

The liquefied waste activated sludge is readily biodegradable. A portion of the liquefied sludge is preferably returned to the aeration tank to recycle nitrogen and phosphorous. The liquefied sludge is therefore ultimately converted to carbon dioxide or is used as a nutrient substrate for the microbes reproducing in the aeration tank. Optionally, some of the liquefied sludge may be pumped to an anaerobic treatment plant where it is converted to methane and carbon dioxide.

The applicant's process has been shown to be suitable for treatment of effluent derived waste activated sludge from pulp and paper mills. Approximately 20% of the ongoing cost of treating pulp mill effluent in an activated sludge process is attributable to supplying oxygen to the aeration tank and approximately 80% of the ongoing costs are attributable to supplying other materials, principally nitrogen, phosphorous and polymer, and for waste activated sludge disposal. As explained above, the applicant's process returns a portion of the liquefied waste activated sludge to the aeration tank to recycle nitrogen and phosphorous and largely avoids the costs associated with dewatering, polymer addition and waste disposal. This reduces the second category of costs significantly (from 80% to about 10% of the total amount).

EXAMPLE 1

Waste activated sludge derived from a pulp mill was treated in a conventional anaerobic treatment facility which resulted in a 30% reduction in volatile solids over a period of 30 days. The same sludge was treated in accordance with the invention with sodium hydroxide to pH 11 and then pumped through a homogenizer nozzle at a pressure of 12,000 psi. Treatment in accordance with the invention resulted in 72% liquefaction as measured by the reduction in total suspended solids concentration and 69% total volatile solids reduction over a period of 5 days.

EXAMPLE 2

The sludge of Example 1 was treated in accordance with the invention with sodium hydroxide to pH 11 and then pumped through a homogenizer nozzle at a pressure of 18,000 psi. Such treatment resulted in 76% liquefaction as measured by the reduction in total suspended solids concentration and 72% total volatile solids reduction over a period of 5 days.

The results of Examples 1 and 2 indicate that the Applicant's process achieves a significantly improved reduction in volatile solids in a much shorter time period than conventional systems (i.e. over twice as many volatile solids were removed from the slurry in one sixth the time). This amounts to a greater than ten fold improvement in performance. Accordingly, in comparison to existing waste activation sludge treatment systems, the Applicant's process can operate at a much higher capacity with lower capital and operating costs.

As should be apparent to someone skilled in the art, in addition to solids management, the present invention could also be used for killing microbes present in water. Although the concentration of microbes present in water would be significantly lower than in biosolids, the same process steps could be used lyze the microorganisms which are present (apart from maceration which is only useful for solid material).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of liquefying microorganisms present in a slurry of waste activated sludge produced by a biological wastewater treatment facility, said sludge comprising volatile solids comprising:

(a) obtaining a slurry containing said microorganisms from said treatment facility;

and (b)] passing said slurry through a nozzle having a restricted flow area at a pressure exceeding 12,000 psi to cause liquefaction of said microorganisms as they are discharged from said nozzle wherein said method increases the biodegradation rate of said volatile solids present in said sludge by at least 200% as compared to untreated sludge.

2. The method of claim 1, further comprising the step of recirculating at least part of the liquefied microorganisms to said treatment facility.

3. The method of claim 1, further comprising the step of anaerobically converting the liquefied microorganisms to methane and carbon dioxide.

4. The method of claim 1, further comprising the step of chemically treating said microorganisms to weaken their cell walls prior to passing them through said nozzle.

5. The method of claim 4, wherein the step of chemically treating comprises altering the pH of said slurry containing said microorganisms.

6. The method of claim 4, wherein said pH is increased to approximately pH 11.

7. The method of claim 4, wherein said pH is lowered to approximately pH 2.

8. The method of claim 1, further comprising the step of macerating said slurry before passing it through said nozzle.

9. A method of treating waste activated sludge comprising the steps of (a) obtaining a supply of waste activated sludge from a wastewater treatment facility;

(b) altering the pH of said sludge;

(c) macerating said sludge to reduce the size of solids present in said sludge; and (d) passing a liquid slurry of said sludge at high pressure through a nozzle having a restricted flow area, whereby the pressure drop across said nozzle exceeds 12,000 psi to cause lysis of biological cells present in said sludge as they are discharged from said nozzle.

10. A method of treating microorganisms present in a slurry of waste activated sludge produced by a biological wastewater treatment facility, said sludge comprising volatile solids, comprising:

(a) passing said slurry through a nozzle having a restricted flow area at a pressure exceeding 12,000 psi to cause liquefaction of said microorganisms as they are discharged from said nozzle, and (b) digesting said slurry to biodegrade said volatile solids, wherein said method increases the biodegradation rate of said volatile solids during said digesting step by at least 200% as compared to untreated sludge.

11. The method as defined in claim 10, wherein the biodegradation rate of said volatile solids during said digesting step is increased by at least 300% as compared to untreated sludge.

12. The method as defined in claim 10, wherein said digesting step is conducted under anaerobic conditions.

13. The method as defined in claim 10, wherein said digesting step is conducted under aerobic conditions.

* * * * *